United States Patent
Waddington

(10) Patent No.: US 7,219,347 B1
(45) Date of Patent: May 15, 2007

(54) RESOURCE SCHEDULING

(75) Inventor: Daniel G Waddington, Lancaster (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/913,463

(22) PCT Filed: Mar. 3, 2000

(86) PCT No.: PCT/GB00/00783

§ 371 (c)(1),
(2), (4) Date: Aug. 15, 2001

(87) PCT Pub. No.: WO00/55732

PCT Pub. Date: Sep. 21, 2000

(30) Foreign Application Priority Data

| Mar. 15, 1999 | (EP) | ................................... | 99301952 |
| May 20, 1999 | (EP) | ................................... | 99303936 |

(51) Int. Cl.
*G06F 9/46* (2006.01)
(52) U.S. Cl. ..................................... 718/104; 718/102
(58) Field of Classification Search .................... 718/1, 718/100–108
See application file for complete search history.

(56) References Cited

U.S. PATENT DOCUMENTS

| 5,247,677 | A | | 9/1993 | Welland et al. |
| 5,640,595 | A | * | 6/1997 | Baugher et al. ............... 710/10 |
| 5,701,465 | A | * | 12/1997 | Baugher et al. ............... 707/10 |
| 5,778,245 | A | * | 7/1998 | Papworth et al. ............. 712/23 |
| 5,790,851 | A | * | 8/1998 | Frank et al. ................. 718/104 |
| 5,812,844 | A | | 9/1998 | Jones et al. |
| 6,253,225 | B1 | * | 6/2001 | Nakahara et al. ........... 718/100 |
| 6,292,492 | B1 | * | 9/2001 | Bonomi et al. ............. 370/415 |
| 6,584,489 | B1 | * | 6/2003 | Jones et al. ................. 718/104 |

FOREIGN PATENT DOCUMENTS

| EP | 0658841 A2 | 6/1995 |
| EP | 0790557 A2 | 8/1997 |
| EP | 0798638 A2 | 10/1997 |
| EP | 0817041 A2 | 1/1998 |

OTHER PUBLICATIONS

European Examination Report dated Oct. 14, 2003.

* cited by examiner

*Primary Examiner*—Meng-Al T. An
*Assistant Examiner*—Kenneth Tang
(74) *Attorney, Agent, or Firm*—Nixon & Vanderhye P.C.

(57) ABSTRACT

Resource utilization in a computer is achieved by running a first process to make a reservation for access to a resource in dependence on a resource requirement communication from an application and running a second process to grant requests for access to that resource from that application in dependence on the reservation. A further process provides a common interface between the first process for each resource and the application. The further process converts high-level abstract resource requirement definitions into formats applicable to the first process for the resource in question. The processes are preferably implemented as methods of software objects.

10 Claims, 5 Drawing Sheets

(CPU SECONDARY SCHEDULER)

(ALTERNATE CPU SECONDARY SCHEDULER)

RESOURCE SCHEDULING

BACKGROUND

1. Field of the Invention

The present invention relates to resource scheduling in a computer.

2. Related Art

Enterprise level general-purpose operating systems, both workstation and server, are traditionally designed for efficient resource utilisation. Applications share a common set of resources, which are initially scheduled according to their priority and then in a fair weighted manner. This approach results is both an efficient and fair division of resources to user-level applications. However, certain applications, in particularly multimedia processing applications, are inherently sensitive to resource availability. As a result, the use of priority-based resource federation policies often results in such applications failing to meet their processing goals.

U.S. Pat. No. 5,812,844 discloses a method of CPU scheduling, using the Earliest Deadline First scheduling of threads. However, there is no notion of resource admission in this invention and therefore guarantees are only best-effort and the scheduling is only single level, based on threads. Scheduling dependent upon process priority and/or urgency is not included. EP-A-0 798 638 discloses a further approach to CPU scheduling, in which a number of processes exist as a group. In turn the group is 'scheduled' by increasing its priority, although the scheduler cannot guarantee that a process within a group will be scheduled.

Conventionally, relatively complex processing is required of the scheduling process at the stage where a process is granted access to a resource. The present invention enables a reduction in the complexity of the processing at the access grant stage by providing for reservation of resources in advance.

BRIEF SUMMARY

According to an exemplary embodiment of the present invention, there is provided a method of administering resource utilization in a computer, the method comprising the steps of: running a first process to make a reservation for access to a resource in dependence on a resource requirement communication from an application process; running a second process to grant requests for access to said resource from said application process in dependence on said reservation; creating a scheduling means having a method or methods for processing reservation requests for a plurality of resources and initiating resource specific reservation processing; creating a reservation means having a method or methods for making reservations for access to a resource; said application process calling a method of the scheduling means, said method taking a first resource access requirement definition as a parameter; said method of the scheduling means calling a reservation method of the reservation means to make a reservation for said application process, the reservation method taking a second resource access requirement definition as a parameter; running a resource specific scheduling process to grant access to a resource in dependence on the reservation made by the reservation means; and utilizing said resource of the purposes of said application process. The reservation request may be made by an application per se or a sub-process or component thereof. Furthermore, access may be granted to any process of an application or for a particular sub-unit of the application for which the reservation request was made.

Making reservations and granting access at application level assists in embodiments of the present invention intended to operate with legacy code. However, where all applications are written for an operating system employing a scheduling method according to the present invention, component or thread level reservation and access grant is preferred.

Preferably, said method of the scheduling means translates the first resource requirement definition into the second resource requirement definition. The advantage of this is that the resource request can be defined by a programmer in a hardware independent manner and the scheduling object for a particular platform can translate that programmer-produced resource request in a potentially non-linear manner on the basis of the properties of the particular platform.

A method according to an exemplary embodiment of the present invention can be applied to the allocation of CPU time, access to mass storage devices, e.g., hard disk drives, optical disk drives and the like, and memory management.

Preferably in the case of mass storage access, said first process comprises allocating one or more "lottery ticket" numbers to said application or a process thereof in dependence on the second resource access requirement definition and storing requests for access to a mass storage device from application processes; generating substantially randomly a lottery ticket number; and if no application process has been allocated said lottery ticket number then passing on to a mass storage device driver process the stored request for access from an application process selected on the basis of a predetermined prioritisation criterion else passing on to a mass storage device driver process a stored request for access from an application process to which said lottery ticket number was allocated.

The majority of multi-tasking operating systems, including Windows NT, Unix and Linux, use a scheduling algorithm known as Round-Robin. At the end of a time slot, or when a thread has revoked its time slice, the dispatcher takes off the first thread which is waiting on the highest priority queue (some queues will be empty). Additional techniques are used to prevent starvation by dynamically increasing the priority of long-waiting threads.

According to an exemplary embodiment of the present invention, there is also provided a method of scheduling access to a CPU which may be implemented in a method of administering resource utilization in a computer according to the present invention, the method comprising the steps of: generating a one-dimensional reservation request pattern; merging the reservation request pattern with a one-dimensional CPU access control pattern, representing empty CPU access time slots and reserved CPU access time slots, without substantially disturbing either the reservation request pattern or the reserved CPU access time slots in the reservation request pattern.

The reservation request pattern may be shorter than the CPU access control pattern, in which case the reservation request pattern is effectively extended by repetition in the merging process. Preferably, said merging step comprises relocating a non-empty time slot element of the reservation request pattern or the CPU access control pattern such that the patterns can be merged without any reserved CPU access time slot elements being deleted or overwritten. More preferably, the relocated non-empty time slot element is relocated by an amount defined in said time slot element. Both forwards and backwards shifts or shift limits may be included in each element.

According to an exemplary embodiment of the present invention, there is provided a method of granting access to a CPU which may be implemented in a method of administering resource utilization in a computer according to the present invention, the method comprising:

generating a one-dimensional CPU access control pattern, each element of which relates to a quantum of CPU access time; and at the end of a quantum of CPU access time;

generating access to any pending processes having a priority greater than a predetermined level; and then if the next pattern element is empty then granting access to a pending process meeting a predetermined prioritization (e.g., Round-Robin) criterion else granting access to a process identified in the pattern element.

Preferably, an entry for the process in any of a plurality of different priority queues will be searched for and access will be granted in respect of the entry for the process having the highest priority. Alternatively, access is granted to the process identified in the pattern element when there is not a populated process queue having a higher priority than the queue in which said process is present. Preferably, the a one-dimensional CPU access control pattern is generated by a method of scheduling access to a CPU according to the present invention.

BRIEF DESCRIPTION OF THE DRAWINGS

Embodiments of the present invention will now be described, by way of example, with reference to the accompanying drawings, in which:—

DETAILED DESCRIPTION OF EXEMPLARY EMBODIMENTS

Figure 1:
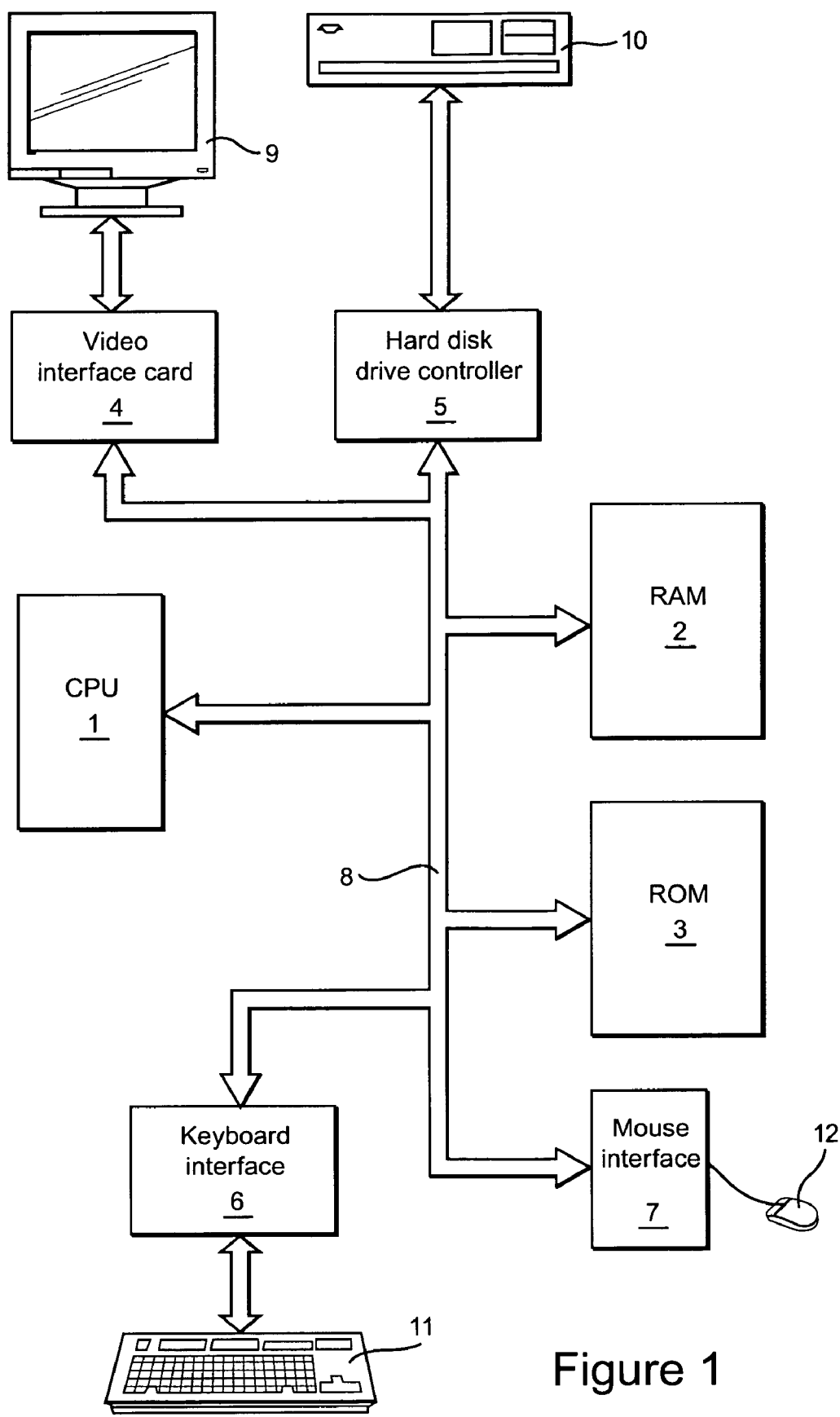
FIG. 1 is a block diagram of a general purpose computer.

Referring to FIG. 1, a general purpose computer comprises a CPU 1, RAM 2, ROM 3, a video interface card 4, a hard disk drive controller 5, a keyboard interface 6 and a mouse interface 7 all interconnected by a combined data and address bus 8. A video monitor 9 is connected to the output of the video interface card 4. A hard disk drive 10 is connected to the hard disk drive controller 5. A keyboard 11 is connected to the input of the keyboard interface 6 and a mouse 12 is connected to the input of the mouse interface 7.

The general purpose computer is operating under the control of a multi-tasking operating system. The operating system may be a known operating system such as Windows NT, Unix or Linux but with the resource scheduling modified to operate as described below.

Figure 2:
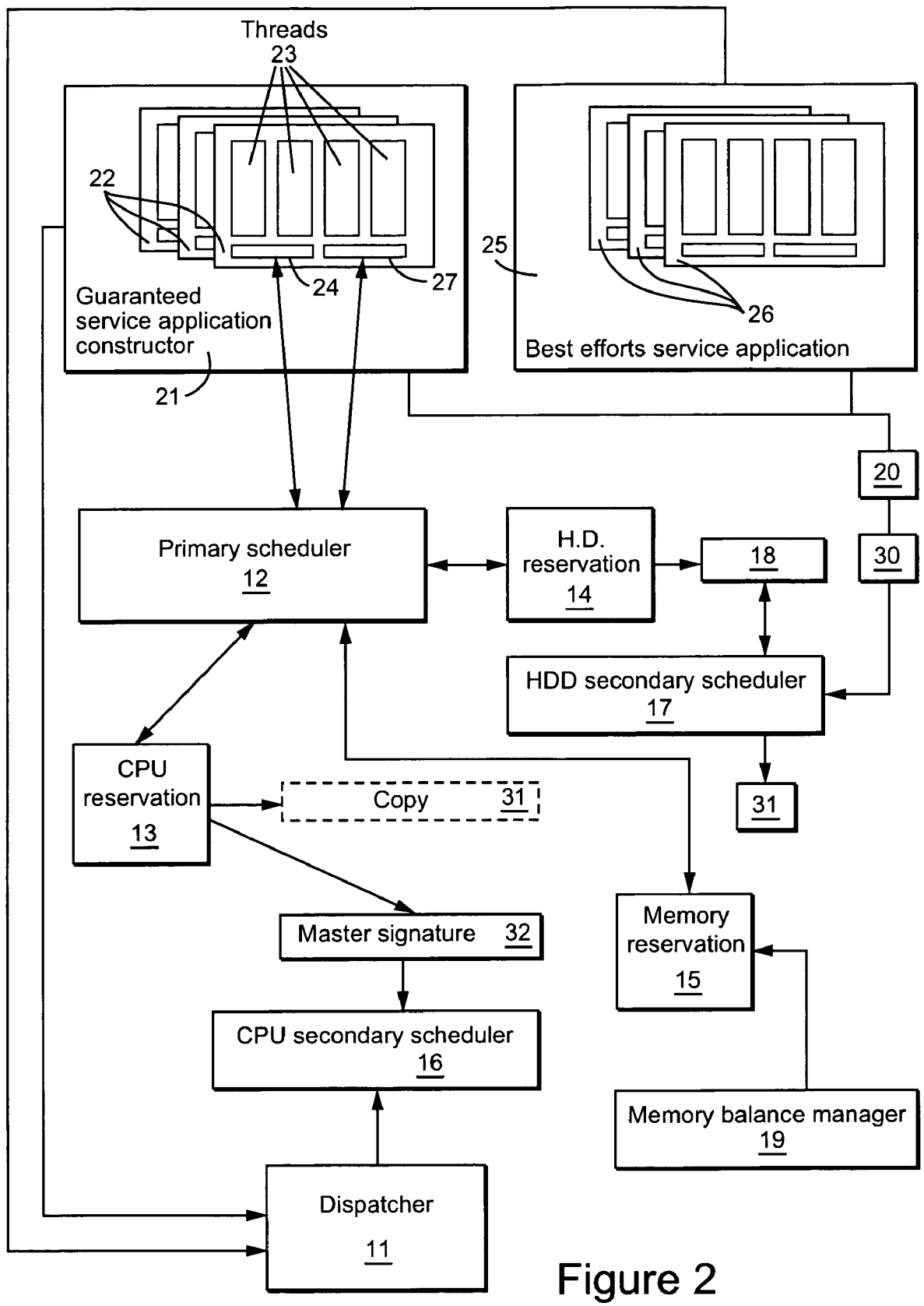
FIG. 2 is a block diagram of software components embodied in a computer employing resource scheduling according to the present invention.

Referring to FIG. 2, in order to provide resource sharing the operating system comprises a dispatcher component 11, a primary scheduler component 12, a CPU reservation component 13, a hard disk drive reservation component 14, a memory reservation component 15, a CPU secondary scheduler 16, a hard disk drive secondary scheduler 17 and a memory balance manager 19.

The dispatcher component 11 maintains queues of threads awaiting servicing by the CPU 1. A thread may have a priority value between 0 and 31, 31 being the highest priority, and the dispatcher component 11 maintains a separate queue for each priority. Thus, all the threads with priority 0 are in one queue, all the threads with priority 1 are in another queue and so on. Within each queue, new threads are added to the tail of the queue which operates on a FIFO principle.

The CPU secondary scheduler 16 is responsible for granting access to the CPU 1 to threads in a manner that will be described in more detail below. The hard disk drive secondary scheduler 17 runs a lottery to determine access to the hard disk drive 10.

The primary scheduler 12 translates high-level abstract resource reservation requests, made by or on behalf of application components 22, into a form suitable for use by the reservation components 13, 14, 15. The reservation components 13, 14, 15 attempt to reserve the requested resources.

A guaranteed service application 21 for use with the present embodiment, consists of a plurality of a components 22 that are instantiated as necessary. Each component 22 comprises at least one thread 23. The constructor 24 of each component 22 includes a procedure which calls CPU, hard disk drive and memory reservation methods of the primary scheduler 12. The component 22 indicates its level of need for a resource by passing the application's process ID (which is unique to the application 21), an indication of the amount of resource required as parameters when calling the reservation methods and optionally a duration for the reservation. Alternatively, the application 21 itself or a management entity, can make a reservation on behalf of the guaranteed service application 21. A best effort service application 25 consists of a plurality of a components 26 that are instantiated as necessary. The best effort service application's components 26 do not make resource reservations or have reservations made for them.

Considering now the case of a request for CPU time, when the CPU reservation method of the primary scheduler 12 is invoked by an application component's constructor 24, the CPU reservation method maps a percentage of resource time, received as a reservation parameter, into a component "signature". The component signature comprises a one-dimensional array of up to 256 elements, each element of which is a record comprising fields for the application's process ID for the component 22, a reservation ID, the forwards flexibility and the backwards flexibility. Initially, the fields of the elements of the array are empty. The fields of selected elements of the array are then filled using the parameters of the call made by the component 22. For instance, if the percentage value in the call is 10%, every tenth element of the array is filled and if the percentage value us 20%, every fifth element of the array is filled in. This mapping generally aims to achieve the finest grained reservation signature possible.

Once the component signature has been completed, the CPU reservation component 13 is instantiated on demand by the primary scheduler 12. When the CPU reservation component 13 is instantiated, the primary scheduler 12 forwards the component signature, application and reservation Ids and any duration to the CPU reservation component 13 via a method invocation.

Figure 3:
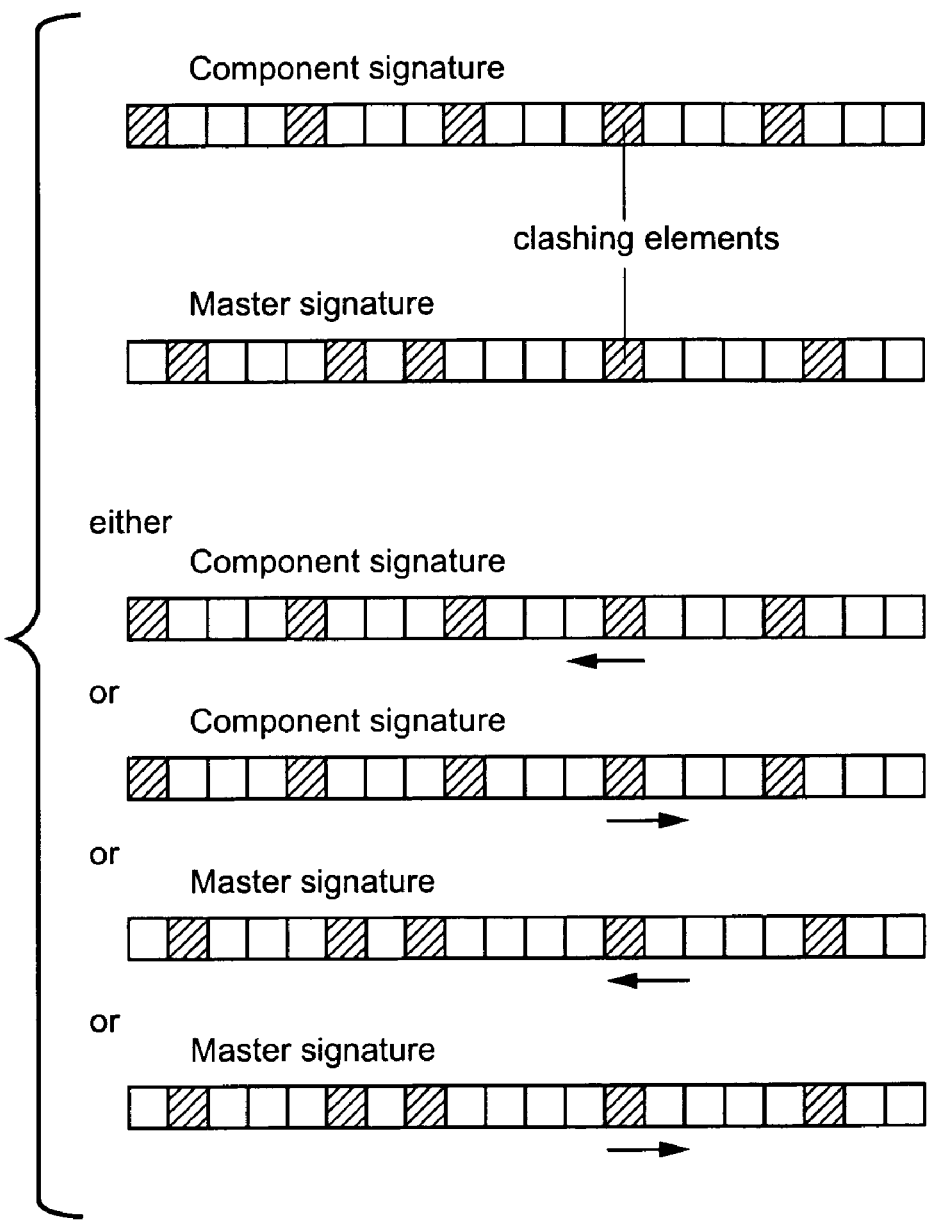
FIG. 3 illustrates part of a CPU time reservation method according to the present invention.

The CPU reservation component 13 then tries to merge the component signature into a copy 31 of a master signature 32. The component signature is replicated to fill the full lengths of the signature arrays 31, 32 used by the CPU reservation component 13 and the CPU secondary scheduler 16. For example a reservation signature of 25% maps onto a 1 in 4 slot signature which is repeated 64 times. If any elements of the component signature clashes with an existing reservations (see FIG. 3), the CPU reservation component 13 tries moving the clashing elements of the component signature according to their forwards and backwards flexibility values and moving the clashing elements of the copy 31 of the master signature 32, according to their backwards and forwards flexibilities, until the component signature fits into the copy 31 of the master signature 32. If this cannot be achieved an exception is raised and communicated back to the component 22 via the primary scheduler 12. If merging is achieved, the master signature 32 is updated according to the modified copy 31 and this information is communicated back to the primary scheduler 12. The primary scheduler 12 then returns to reservation ID to the calling component 22.

The CPU reservation component 13 always maintains at least a predetermined minimum number of elements of the master signature 32 free for the set of best effort applications 25. Each element of the master signature 32 corresponds to one CPU access time slice, e.g. 20 ms. The CPU reservation component 13 automatically deletes reservations, requested with a duration parameter, that have time-expired.

The CPU secondary scheduler 16 uses the master signature 32 cyclically to allocate CPU time to components 22. The use of allocated CPU time by the threads 23 within a component 22 is the responsibility of the application programmer.

Priority based scheduling is used to schedule threads 23 which are very high priority threads (above priority level 15) that are essential to the integrity of the system. This means that threads 23 associated with time-critical operating system tasks, do not have to undergo the process of reservation and admission, as described above. The master signature 32 is used specifically for priority levels 0–15. The reason for this approach is to make possible support for legacy operating system code and services that are essential to the stability of the system.

The CPU secondary scheduler 16, uses the standard Round-Robin scheduling algorithm for threads with a priority greater than 15. Generally, these threads will not require a complete time-slice and are therefore negligible in terms of CPU access time.

Figure 4:
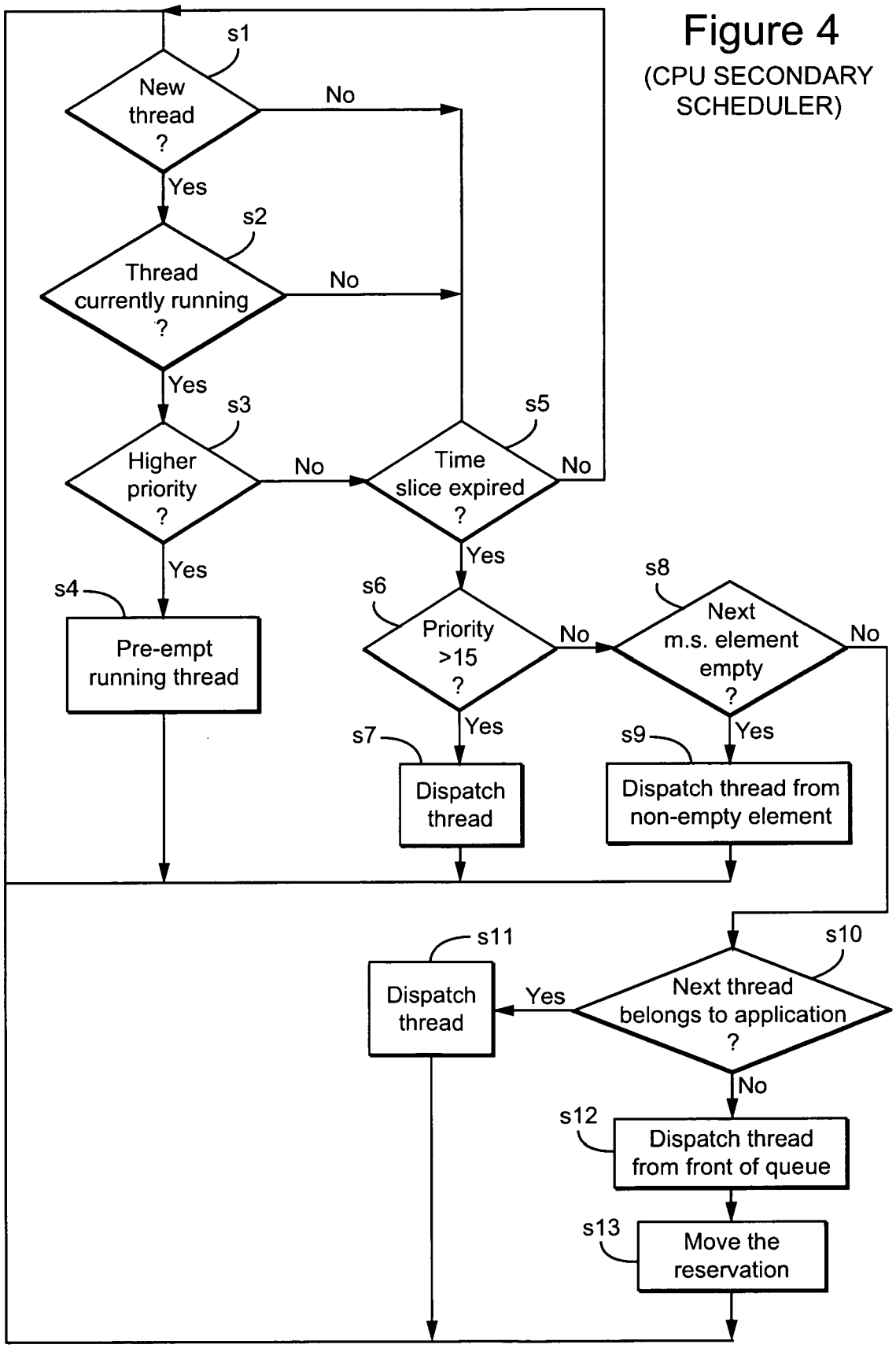
FIG. 4 is a flow chart illustrating the operation of the CPU secondary scheduler of FIG. 2.

Referring to FIG. 4, the CPU secondary scheduler 16 repeatedly performs the following process. The CPU secondary scheduler 16 determines whether a new thread is pending in the dispatcher 11 (step s1). If a new thread is pending, the CPU secondary scheduler 16 determines whether a thread is currently running (step s2). If a thread is currently running, it determines whether the new pending thread has a higher priority than the running thread (in this context a guaranteed service thread has "priority" over a best-effort service thread with the same priority) (step s3). If the new thread's priority is higher, the CPU secondary scheduler 16 pre-empts the running thread, dispatches the new thread and places the pre-empted thread at the head of its priority level queue in the dispatcher 11 (step s4).

If, at step s1, a new thread is not ready or, at step s2, no thread is running, the CPU secondary scheduler 16 determines whether the current time slice has expired (step s5). If the current time-slice has not expired then the process returns to step s1 else dispatches the thread (step s7) at the head of the dispatcher queue for the highest priority greater than 15 (step s6).

If, at step s6, no threads with priorities greater than 15 are pending, the CPU secondary scheduler 16 inspects the next element of the master signature (step s8). If the element is empty, the CPU secondary scheduler 16 dispatches the thread from the front of the highest priority queue that is not empty (step s9). If the element is not empty, the CPU secondary scheduler 16 looks for a thread belonging to the application, identified in the master signature element, in the highest priority populated queue in the dispatcher 11 (step s10). If one is found then it is dispatched (step s11) else the thread from the front of the queue is dispatched (step s12) and the CPU secondary scheduler 16 attempts to move the reservation (step s13). This dynamic slot shift can only be made to the extent of the next slot reserved by the same guaranteed service application 21. The reservation is returned to its correct position for the next cycle through the master signature and if the master signature is updated by the CPU reservation component 13.

It should be noted that whenever a guaranteed service thread cannot be serviced at steps s8 and s10, the best-effort service application 25 has the possibility of having its threads 26 dispatched.

When a component 22 of the guaranteed service application 21 is destroyed, its destructor 27 it may invoke a reservation cancel method of the primary scheduler 12, passing the reservation ID as a parameter. The primary scheduler 12 then invokes a cancellation method of the CPU reservation component 13 which removes the calling component's slot reservations from the copy 31 of the master signature 32 and then updates the master signature 32.

Considering now the case of disk access, an IRP (I/O Request Packet) is an encapsulated request, which defines the processing requirements, including the type of operation to be carried out (read or write), the number of bytes to manipulate, the synchrony of the request etc.

The constructor 24 of a component 22 includes a procedure for registering the guaranteed service application 21 for disk access. This process calls a disk access reservation method of the primary scheduler 12 with a demand level indicator, usually a percentile, as a parameter. The primary scheduler 12 then calls a disk access reservation method of the hard disk drive reservation component 14 with the demand level indicator as a parameter. The hard disk drive reservation component 14 then allocates a number of "lottery tickets" to the application 21 containing the component 22 in dependence on the demand level indicator. The number of lottery tickets issued may be increased as the demand level indicator is increased. The component 22 may request an abstract reservation in terms of a class identifier which the primary scheduler 12 can use to reference a persistent lookup table mapping the appropriate demand level indicator.

When a thread 23, belonging to a guaranteed service application 21, requires disk access, it sends an IRP to an operating systems I/O manager 20, which is then forwarded to the hard disk secondary scheduler 17 via the operating system's file system component 30. The operating system's file system component 30 increases the granularity of the access request, e.g. from a request for one large block a data to many small blocks of data. When the IRP reaches the hard disk secondary scheduler 17, it is place in a wait array according to the guaranteed service application's process ID. The hard disk drive secondary scheduler 17 runs a lottery by randomly generating "ticket" numbers. If winning application 21 has an IRP in the wait array, the winning application 21 is granted disk access and the longest waiting IRP for the winning application is passed on to a physical disk device driver process 32. When there is no winning ticket holder or the winning ticket holder does not have an IRP ready for servicing, then an alternative IRP is scheduled via a simple cyclic selection scheme which includes IRPs from the best effort service application 25.

When a component 22 of the guaranteed service application 21 is destroyed, its destructor 27 determines whether it is the only instance of a component 22 of the application 21. If it is the last such instance, it invokes a cancel hard disk access method of the primary scheduler 12 which in turn invokes a cancellation method of the hard disk drive reservation component 14. The hard disk drive reservation component 14 then de-allocates the tickets allocated to the application 21.

Considering now the case of memory access, each application 21, 25 maintains its own unique virtual address space, which is a set of memory addresses available for its threads to use. This address space is much larger than the RAM 2 of the computer. When a component 22, 26 references its application's virtual memory, it does so with a pointer which is used by a virtual memory manager to determine the location in RAM 2 to which the virtual address maps. However, some portions of memory may actually reside on disk 10 or backing store. This means that data or code which is infrequently accessed is held on disk 10 thus retaining RAM 2 for better use. To facilitate this scheme, memory is managed in fixed size blocks known as "pages", which are usually 4 Kb or 8 Kb. If a component 22 references an address whose page is not in RAM 2, then a page fault occurs. This triggers a process known as "paging" which is the task of locating the faulted page within the page file and then loading the page into RAM 2. If there is insufficient space in RAM 2, then a page must be first swapped out and written to the page file. However, each process usually keeps a minimum number of pages locked into RAM 2 known as the "working set".

All modern operating systems generally protect memory in three forms:—physical hardware disallows any thread from accessing the virtual address space of other components, a distinction is made between the mode of operation, kernel-mode (ring 0) which allows threads access to system code and data, and user-mode (ring 3) which does not, and a page-based protection mechanism wherein each virtual page maintains a set of flags that determine the type of access permitted. However, these mechanisms are aimed at protecting a component's memory resources from unwanted interference by other unauthorised processes in the system. They do not prevent a process from consuming more than its reasonable share of memory.

To aid understanding of the approach of the present invention to the implementation of working set size control, the working set management scheme in Windows NT will be briefly described. When created, each component is assigned two thresholds, a minimum working-set size and maximum working-set size. The minimum defines the smallest number of pages the virtual memory manager attempts to keep locked concurrently in physical memory, whilst the maximum defines an expansion range which can be used if the component is causing a considerable number of page faults. If the working set is too small, then the component incurs a large number of paging operations and thus a substantial overhead is incurred through continuously swapping pages to and from the backing store. Alternatively, if the working set is too large, few page faults occur but the physical memory may be holding code and/or data which is infrequently referenced and thus overall efficiency is reduced. In Windows NT, the Memory Manager (MM) adjusts the working sets once every second, in response to page-in operations or when free memory drops to below a given threshold. If free memory is plentiful, the MM removes infrequently referenced pages only from working sets of components whose current size is above a given minimum, this is known as aggressive trimming. However, if free memory is scarce, the MM can force trimming of pages from any component until it creates an adequate number of pages, even beyond the minimum threshold. Of course, components which have extended working sets are trimmed in preference to those which have the minimum working set size.

In the present embodiment, the constructor 24 of a component 22 includes a procedure for reserving a working set. This procedure calls a memory reservation method of the primary scheduler 12 which, in turn calls a method of the memory reservation component 15. The memory reservation component 15 translates this request into the appropriate expansion of a default minimum working set size. The minimum working set size regulates the number of pages an application 21 can concurrently lock (or pin) into RAM 2. Thus, a component 22 that wishes to reserve a portion of memory, makes the reservation request via the primary scheduler 12 to the memory reservation component 15 which then increases the working set thresholds accordingly. This adjustment is facilitated through operating system calls. It is then the responsibility of the component to pin the pages into RAM 2 as required. The pinning process is arbitrated on a first-come first-serve basis. If insufficient physical pages are available, the operating system will reject the pin request, therefore the component 22 is expected to pin its reserved pages soon after allocation.

If there are insufficient free physical memory resources, the memory reservation component 15 then attempts to force the processes of best-effort service applications 25 to write pages back to file store until sufficient free physical pages are available. If insufficient space can be made, then the reservation is rejected. As with the other resource modules, a portion of the RAM 2 is reserved for a minimal best-effort service. This is facilitated by maintaining a count of the total number of physical pages being used under the guaranteed service and checking this against a portion of the total physical page capacity. It should also be noted that the 'best-effort' service is strictly a minimal guaranteed service (defined by the system assigned minimum working set size) in addition to the best-effort service through potential expansion of the working set. It is assumed that processes cannot bypass the primary scheduler 12 and directly alter their own working set size. Finally, special consideration is made for pages which are being used for shared memory purposes. If any client of a shared page has undergone reservation, then the page is classified as reserved even though other clients may not have made a reservation.

A second embodiment is the same as the first embodiment described above except for the manner of operation of the CPU secondary scheduler 16. The operation of the CPU scheduler of the second embodiment will now be described.

Figure 5:
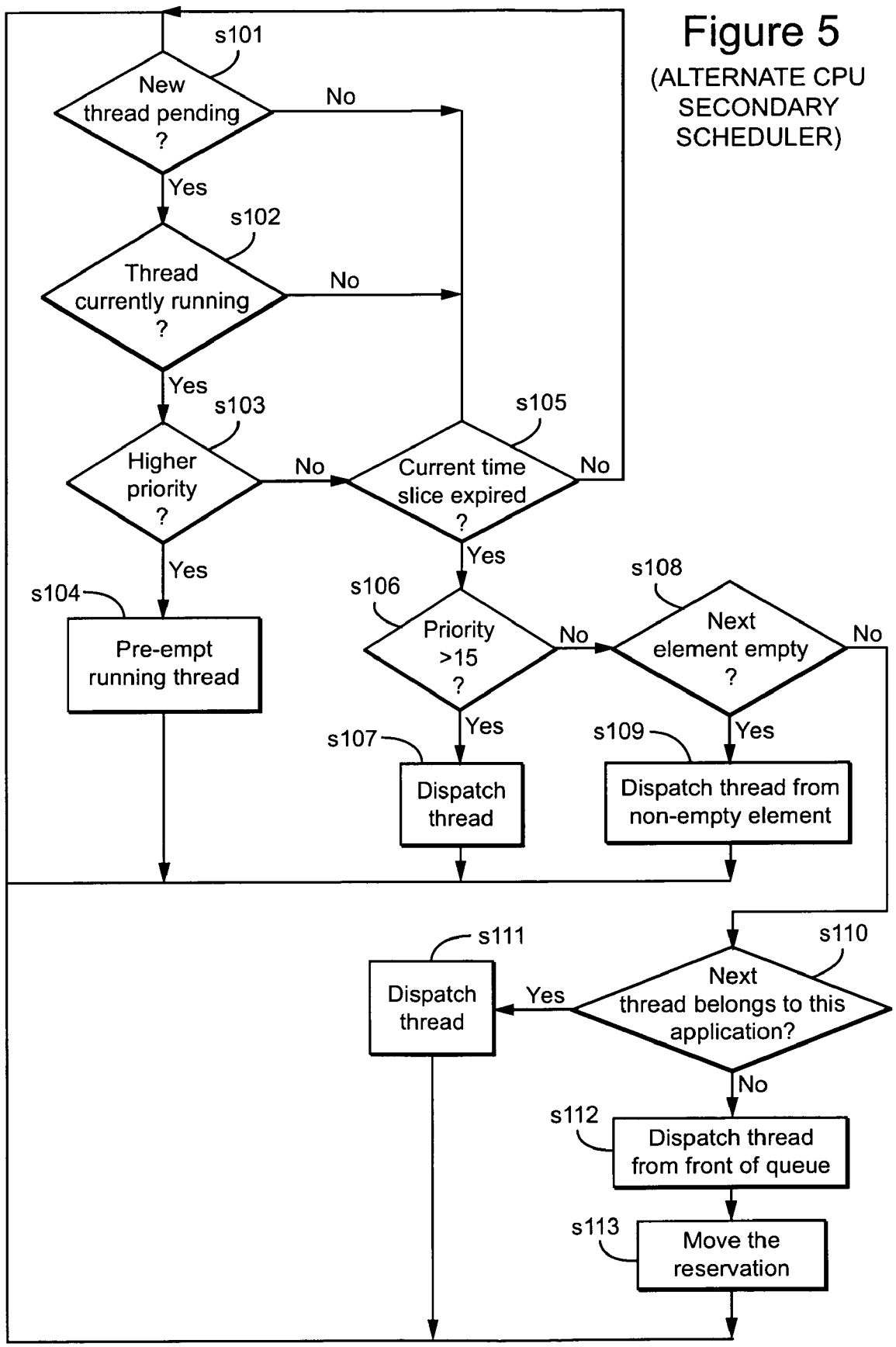
FIG. 5 is a flow chart illustrating an alternative manner of operation of the CPU scheduler of FIG. 2.

Referring to FIGS. 2, 4 and 5, the CPU secondary scheduler 16 repeatedly performs the following process. The CPU secondary scheduler 16 determines whether a new thread is pending in the dispatcher 11 (step s101). If a new thread is pending, the CPU secondary scheduler 16 determines whether a thread is currently running (step s102). If a thread is currently running, it determines whether the new pending thread has a higher priority than the running thread (in this context a guaranteed service thread has "priority" over a best-effort service thread with the same priority) (step s103). If the new thread's priority is higher, the CPU secondary scheduler 16 pre-empts the running thread, dispatches the new thread and places the pre-empted thread at the head of its priority level queue in the dispatcher 11 (step s104).

If, at step s101, a new thread is not ready or, at step s102, no thread is running, the CPU secondary scheduler 16 determines whether the current time slice has expired (step s105). If the current time-slice has not expired then the process returns to step s101 else dispatches the thread (step s107) at the head of the dispatcher queue for the highest priority greater than 15 (step s106).

If, at step s106, no threads with priorities greater than 15 are pending, the CPU secondary scheduler 16 inspects the next element of the master signature (step s108). If the element is empty, the CPU secondary scheduler 16 dispatches the thread from the front of the highest priority queue that is not empty (step s109). If the element is not empty, the CPU secondary scheduler 16 looks for a thread belonging to the application, identified in the master signature element, in a queue in the dispatcher 11 (step s110), searching from the priority 15 queue towards the lowest priority queue and from the head of each queue to the tail thereof. If one is found then it is dispatched (step s111) else the thread from the front of the highest priority populated queue is dispatched (step s112) and the CPU secondary scheduler 16 attempts to move the reservation (step s113). This dynamic slot shift can only be made to the extent of the next slot reserved by the same guaranteed service application 21. The reservation is returned to its correct position for the next cycle through the master signature and if the master signature is updated by the CPU reservation component 13.

It should be noted that whenever a guaranteed service thread cannot be serviced at steps s108 and s110, the best-effort service application 25 has the possibility of having its threads 26 dispatched.

The present invention has been described with reference to applications comprising components which in turn comprise one or more threads. It will be appreciated that the present invention is not limited to this situation and may be implemented in a system in which application programs are not built using object-oriented languages.

Whilst the present invention has been described with reference to CPU, hard disk and memory access, it will be appreciated that it may be applied to the scheduling of access to other resources.

It will be appreciated that the term "lottery ticket" is used figuratively.

What is claimed is:

1. A method of administering resource utilization in a computer, the method comprising:
scheduling reservation requests in accordance with at least one method for a plurality of differing resources of the computer, wherein said scheduling initiates resource specific reservation processing and includes at least one method for making reservations for access to a resource of the computer,
running a first process to make a reservation for access to one of said resources in dependence on a resource requirement communication from an application process, said application process calling a scheduling method taking a hardware independent first resource access requirement definition as a parameter and calling the reservation method to make a reservation for said application process using a hardware dependent second resource access requirement definition as a parameter:
running a second process to grant requests for access to said resource from said application process in dependence on said reservation, comprising running a resource specific scheduling process to grant access to a resource in dependence on the reservation initiated by said first process prior to said second process; and
utilizing said resource for the purposes of said application process;
wherein said scheduling translates the hardware independent first resource access requirement definition into the hardware dependent second resource access requirement definition; and
wherein said scheduling is supported by a platform and said scheduling translates said hardware independent resource access request definition to a second resource access request definition dependent on the properties of said platform.

2. A computer comprising a computer program capable of performing a method of administering resource utilization in a computer when executed by said computer, said method comprising:
scheduling reservation requests in accordance with at least one method for a plurality of differing resources of the computer, wherein said scheduling initiates resource specific reservation processing and includes at least one method for making reservations for access to a resource of the computer,
running a first process to make a reservation for access to one of said resources in dependence on a resource requirement communication from an application process, said application process calling a scheduling method taking a hardware independent first resources access requirement definition as a parameter and calling the reservation method to make a reservation for said application process using a hardware dependent second resource access requirement definition as a parameter;
running a second process to grant requests for access to said resource from said application process in dependence on said reservation, comprising running a resource specific scheduling process to grant access to a resource in dependence on the reservation initiated by said first process prior to said second process; and
utilizing said resource for the purposes of said application process;
wherein said scheduling translates the hardware independent first resources access requirement definition into the hardware dependent second resources access requirement definition; and
wherein said scheduling is supported by a platform and said scheduling translates said hardware independent resources access request definition to a second resources access request definition dependent on the properties of said platform.

3. A tangible computer program storage medium containing a computer program capable of performing a method of administering resource utilization in a computer when executed, said method comprising:
scheduling reservation requests in accordance with at least one method for a plurality of differing resources of the computer, wherein said scheduling initiates resource specific reservation processing and includes at least one method for making reservations for access to a resource of the computer,
running a first process to make a reservation for access to one of said resources in dependence on a resource requirement communication from an application process, said application process calling a scheduling method taking a hardware independent first resource access requirement definition as a parameter and calling the reservation method to make a reservation for said application process using a hardware dependent second resource access requirement definition as a parameter;

running a second process to grant requests for access to said resource from said application process in dependence on said reservation, comprising running a resource specific scheduling process to grant access to a resource in dependence on the reservation initiated by said first process prior to said second process; and utilizing said resource for the purposes of said application process;

wherein said scheduling translates the hardware independent first resource access requirement definition into the hardware dependent second resource access requirement definition; and wherein said scheduling is supported by a platform and said scheduling translates said hardware independent resource access request definition to a second resource access request definition dependent on the properties of said platform.

4. A method of administering resource utilization in a computer, the method comprising:

scheduling reservation requests in accordance with at least one method for a plurality of differing resources of the computer, wherein said scheduling initiates resource specific reservation processing and includes at least one method for making reservations for access to a resource of the computer, running a first process to make a reservation for access to one of said resources in dependence on a resource requirement communication from an application process, said application process calling a scheduling method taking a hardware independent first resource access requirement definition as a parameter and calling the reservation method to make a reservation for said application process using a hardware dependent second resource access requirement definition as a parameter:

running a second process to grant requests for access to said resource from said application process in dependence on said reservation, comprising running a resource specific scheduling process to grant access to a resource in dependence on the reservation initiated by said first process prior to said second process; and utilizing said resource for the purposes of said application process;

wherein said hardware dependent second resource access requirement definition comprises a one-dimensional reservation request pattern which is merged with a one-dimensional CPU access control pattern, representing empty CPU access time slots and reserved CPU access time slots, without disturbing either the reservation request pattern or the reserved CPU access time slots in the reservation request pattern.

5. A method as in claim 4 wherein said merging step comprises relocating a non-empty time slot element of the reservation request pattern or the CPU access control pattern such that the patterns can be merged without any reserved CPU access time slot elements being deleted or overwritten.

6. A method as in claim 5 wherein the relocated non-empty time slot element is relocated by an amount defined in said time slot element.

7. A method of administering resource utilization in a computer, the method comprising:

scheduling reservation requests in accordance with at least one method for a plurality of differing resources of the computer, wherein said scheduling initiates resource specific reservation processing and includes at least one method for making reservations for access to a resource of the computer, running a first process to make a reservation for access to one of said resources in dependence on a resource requirement communication from an application process, said application process calling a scheduling method taking a hardware independent first resource access requirement definition as a parameter and calling the reservation method to make a reservation for said application process using a hardware dependent second resource access requirement definition as a parameter:

running a second process to grant requests for access to said resource from said application process in dependence on said reservation, comprising running a resource specific scheduling process to grant access to a resource in dependence on the reservation initiated by said first process prior to said second process; and utilizing said resource for the purposes of said application process;

wherein said resource comprises a CPU of the computer, and said scheduling is arranged to reserve access to CPU time for said application process using said second resource access requirement definition in advance of said step of granting a request for access to the CPU; and wherein in said one-dimensional CPU access control pattern, each element relates to a quantum of CPU access time, and wherein in said step of running the second process granting a request for access to said resource from said application process in dependence on said reservation, said step of running a resource specific scheduling process to grant access to a resource comprises granting access to the CPU by performing the steps of:

at the end of a quantum of CPU access time, granting access to any pending processes having a priority greater than a predetermined level; and then if the next pattern element is empty then granting access to a pending process meeting a predetermined prioritization criterion else granting access to a process identified in the next pattern element.

8. A method as in claim 7 wherein pending processes populate queues having different priorities and access is granted to the process identified in the pattern element when there is not a populated process queue having a higher priority than the queue in which said process is present.

9. A method of administering resource utilization in a computer, the method comprising:

scheduling reservation requests in accordance with at least one method for a plurality of differing resources of the computer, wherein said scheduling initiate resource specific reservation processing and includes at least one method for making reservations for access to a resource of the computer, running a first process to make a reservation for access to one of said resources in dependence on a resource requirement communication from an application process, said application process calling a scheduling method taking a hardware independent first resource access requirement definition as a parameter and calling the reservation method to make a reservation for said application process using a hardware dependent second resource access requirement definition as a parameter:

running a second process to grant requests for access to said resource from said application process in dependence on said reservation, comprising running a resource specific scheduling process to grant access to a resource in dependence on the reservation initiated by said first process prior to said second process; and utilizing said resource for the purposes of said application process;

wherein said a second resource access request definition has a form suitable for use by at least one of the following:

a CPU reservation component of the computer; and a memory reservation component of the computer;

wherein said memory reservation component comprises a mass storage device reservation component of the computer;

wherein said resource comprises memory on said mass storage device and said scheduling is arranged to reserve memory for said application process using said second resource requirement definition in advance of said step of granting a request for access to said mass storage device; and wherein when said scheduling makes a reservation and one or more resource tokens are allocated to said application process in dependence on the second resource access requirement definition, and wherein in said second process said step of granting a request for access to said resource, the step of running a resource specific scheduling process to grant access to a resource in dependence on the reservation comprises:

(i) storing requests for access to a mass storage device from application processes;

(ii) generating randomly a resource token identifier; and (iii) if no application process has been allocated, said identified resource token then passes on to a mass storage device driver to process the stored request for access from an application process selected on the basis of a predetermined prioritization criterion, and otherwise:

said identified resource token then passes on to a mass storage device driver process a stored request for access from an application process to which said identified resource token was allocated.

10. A method of administering resource utilization in a computer, the method comprising:

scheduling reservation requests in accordance with at least one method for a plurality of differing resources of the computer, wherein said scheduling initiates resource specific reservation processing and includes at least one method for making reservations for access to a resource of the computer, running a first process to make a reservation for access to one of said resources in dependence on a resource requirement communication from an application process, said application process calling a scheduling method taking a hardware independent first resource access requirement definition as a parameter and calling the reservation method to make a reservation for said application process using a hardware dependent second resource access requirement definition as a parameter:

running a second process to grant requests for access to said resource from said application process in dependence on said reservation, comprising running a resource specific scheduling process to grant access to a resource in dependence on the reservation initiated by said first process prior to said second process; and utilizing said resource for the purposes of said application process;

wherein said a second resource access request definition has a form suitable for use by at least one of the following:

a CPU reservation component of the computer; and a memory reservation component of the computer;

wherein said memory reservation component comprises a mass storage device reservation component of the computer;

wherein said resource comprises memory on said mass storage device and said scheduling is arranged to reserve memory for said application process using said second resource requirement definition in advance of said step of granting a request for access to said mass storage device; and wherein when said scheduling makes a reservation in said first process, a weighting function associated with the application process is determined and in said second process, in said step of granting a request for access to the resource, the step of running a resource specific scheduling process to grant access to a resource in dependence on the reservation made by the reservation means comprises performing the steps of:

(i) storing requests for access to a mass storage device from application processes;

(ii) using a stochastic process, either selecting an application process with a probability determined by the weighting associated with the application process and passing on to a mass storage device driver process the stored request for access from the selected application process, or passing on to a mass storage device driver process a stored request for access from an application process selected on the basis of a predetermined prioritization criterion.

* * * * *